May 15, 1956  R. R. WHIPPLE  2,745,119
HAND SWIMMING PADDLE
Filed June 7, 1954   3 Sheets-Sheet 1
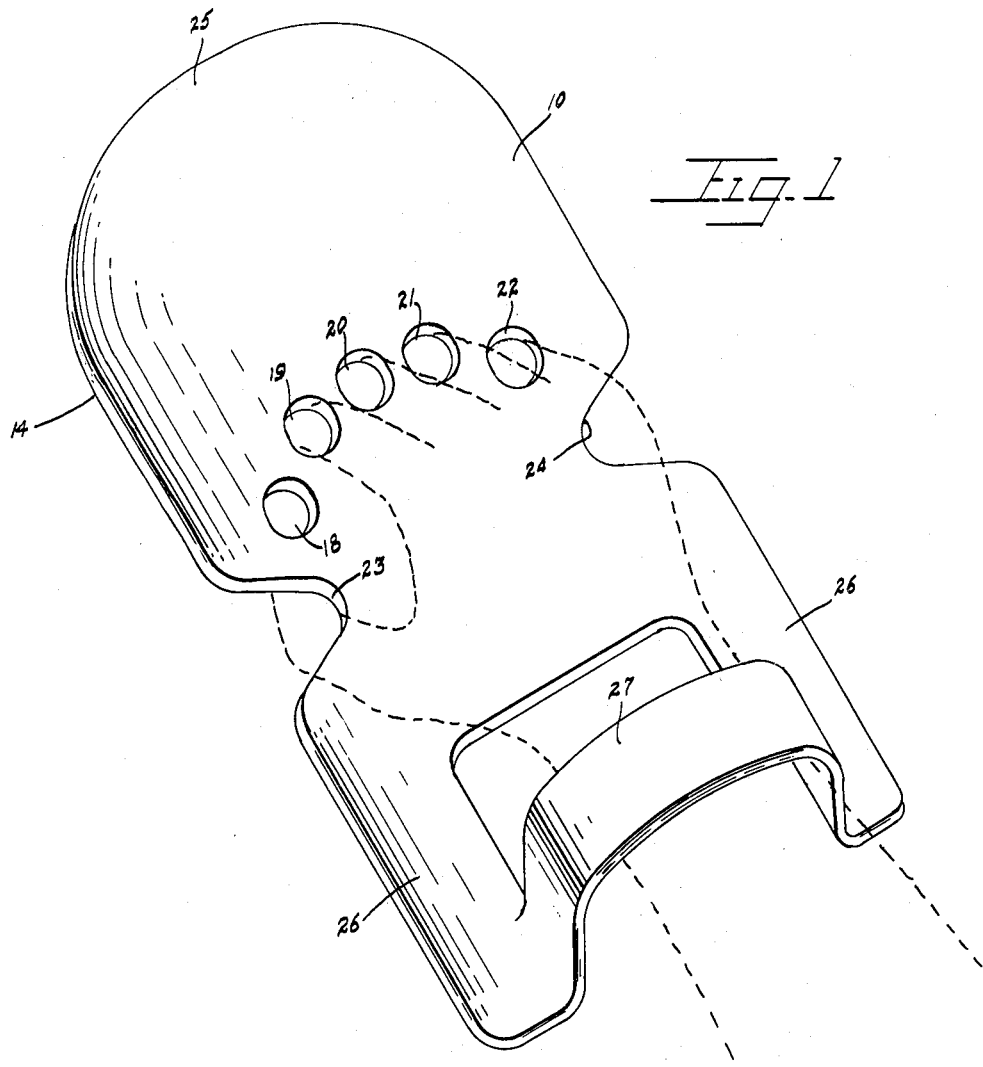
Fig. 1
Fig. 2
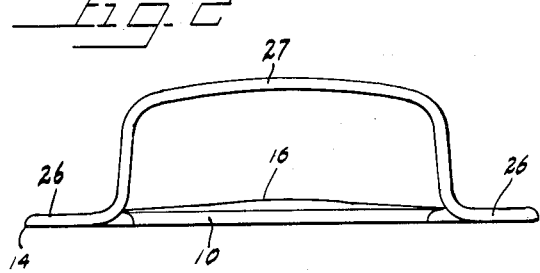
INVENTOR
R. R. WHIPPLE
By W. A. Johnson
ATTORNEY May 15, 1956 R. R. WHIPPLE 2,745,119
HAND SWIMMING PADDLE
Filed June 7, 1954 3 Sheets-Sheet 2
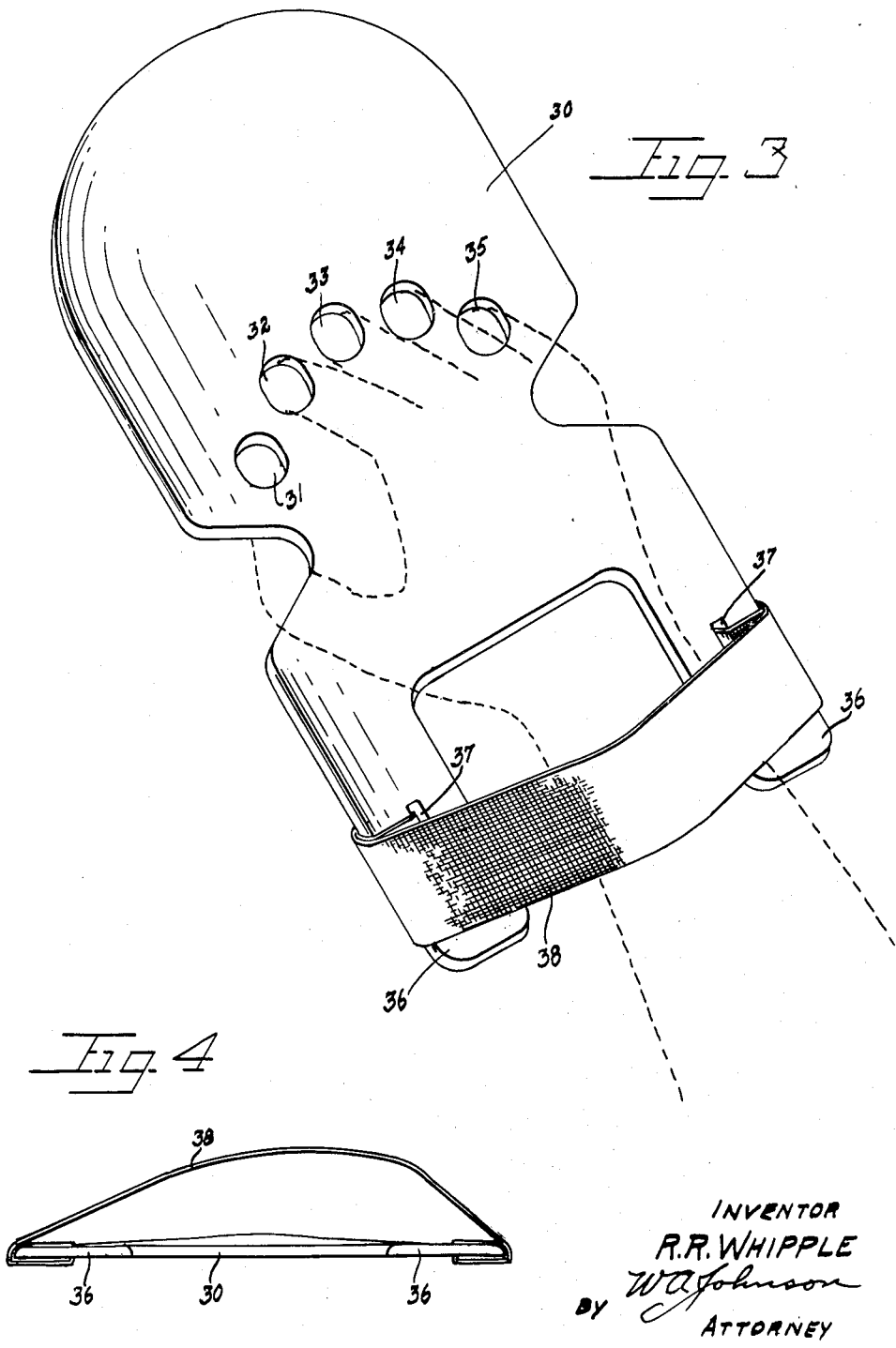
INVENTOR
R.R. WHIPPLE
BY W.A. Johnson
ATTORNEY

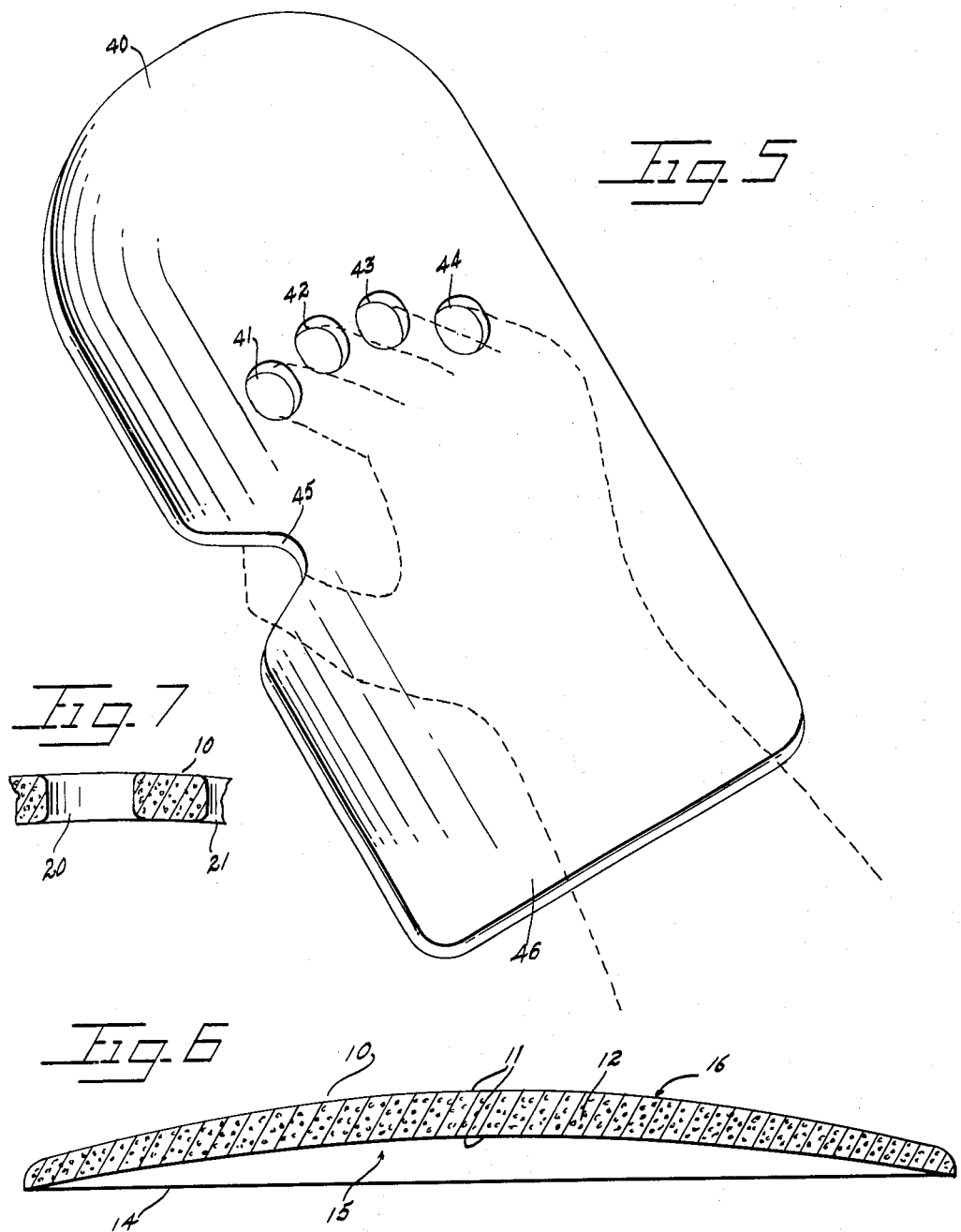

United States Patent Office 2,745,119
Patented May 15, 1956

2,745,119

HAND SWIMMING PADDLE

Richard R. Whipple, Haverhill, Mass.

Application June 7, 1954, Serial No. 434,876

2 Claims. (Cl. 9—21)

This invention relates to hand swimming paddles and has for its object hand swimming paddles which are simple in structure, durable and highly efficient for increasing the hand area of a swimmer.

One of the most continuous ambitions of man has been to increase the speed or ease of locomotion, whether over land or water, through the air or under water. Swimming has seen major improvements of late, particularly in the "schnorkel" tube, face masks, and frog feet which have so assisted spear fishing under water.

Devices, variously known as flippers, frog feet or "webbys," for increasing the area of the feet and hence the efficiency of the large leg muscles, are useful to the general swimmer. They will provide either greater speed or greater ease in swimming. Furthermore, there will be less fatigue for a long slow swim. However, when one swims with these feet attachments, the hands and arms seem impotent. The feet are well coupled to the medium, but the hands slip through the water ineffectively. This effect is so marked that many experts change their arm and leg stroke ratios to, in an attempt to compensate for this difference.

Many designers have recognized the need for an increase of effective hand area, so that a swimmer may get a grip on the water with his hands, comparable to that of the augmented foot area. Most of these devices have taken the form of gloves, with webs between the fingers, which have several undesirable features. The increase in area is insufficient. The added thrust is applied to the fingers, tending to force them back, and produces a turning movement which must be resisted by the wrist, producing unnecessary fatigue that gains nothing. To secure the maximum area, the fingers must be kept straight and spread their extreme distances, an abnormal aspect which is tiring, thus turning what was intended to be a pleasure into an unenjoyable task. Finally, the wearing of gloves in the water produces an unpleasant feeling and prevents the use of the hands freely during intervals of rest as wet gloves are not easy to remove.

Devices of the paddle type, for increasing the area of the swimmer's hand have also been proposed, but, the fact that none of these have ever become popular in use, demonstrates that they have certain objectionable features.

With the aforementioned object in view, the various species of the invention include a swimming paddle which is molded of material and provided with an arcuate group of finger receiving apertures and a thumb receiving indentation.

More specifically the swimming paddle may be formed for definite right and left hand usage or so that the paddle may be used on either hand. The paddle is preferably molded of a suitable plastic which will produce a smooth solid outer surface and a cellular inner portion to give the paddle a strong light body which will withstand the forces applied to it, and will float.

Other objects and advantages will be apparent from the following detailed description when considered in conjunction with the accompanying drawings, wherein:

Fig. 1 is an isometric view of one species of the invention;

Fig. 2 is a rear elevational view of the species shown in Fig. 1;

Fig. 3 is an isometric view of another species of the invention;

Fig. 4 is a rear elevational view of the species shown in Fig. 3;

Fig. 5 is an isometric view of another species of the invention;

Fig. 6 is a lateral sectional view which may be taken through any of the species shown in Figs. 1, 3 and 5, and Fig. 7 is a fragmentary sectional view illustrating the rounded contour of the finger receiving apertures of all three species.

Referring now to the drawings, attention is directed first to Figs. 1 and 2. The species of the invention shown in these figures includes a body 10 molded of a suitable plastic material taken, for example, from a group including sponged plastisols, foaming-agent-impregnated polystyrene beads, and unicellular polyvinyl chloride. As a result the body 10, as shown in Fig. 6 will have a solid outer structure 11 and an inner structure 12 which is light in density and/or cellular to cause the body to float. While observing Fig. 6 attention is directed to the dished contour of the body 10. It is not believed necessary to show several sectional views taken at different angles with respect to each other to illustrate this dished contour. However, with Fig. 6 in view, and with knowledge of the fact that the bottom edge 14 throughout is in a single plane, the body curves between diagonally opposite points substantially as shown in this figure. This produces a concaved undersurface 15 and a convexed upper surface 16.

Returning now to Figs. 1 and 2, it will be noted that five finger receiving apertures 18, 19, 20, 21 and 22 are disposed in arcuate arrangement relative to thumb receiving indentations or pockets 23 and 24 formed in the side edges. The apertures are of sizes sufficient to comfortably receive the fingers of an adult and have rounded surfaces as shown in Fig. 7, particularly where the fingers of the user will grip the body 10. Although the bottom edge 14 appears to be sharp, the portions thereof at the indentations 23 and 24 are rounded to permit comfortable gripping of the body by either thumb.

In this species of the invention the forward end 25 is rounded and the rearward end has integral arms or projections 26 which are parallel with each other and are disposed on each side of an aperture through which the hand of the user may pass. A curved strap or arm engaging element 27 is molded integral with the ends of the projections 26.

The species of the invention shown in Figs. 3 and 4, is similar in every detail to the species shown in Figs. 1 and 2 with the exception of the arm engaging element and the manner in which it is mounted. In this species a body 30 has the same general structure and contour as shown in and described above regarding Figs. 6 and 7. The five finger receiving apertures 31, 32, 33, 34 and 35 and the thumb receiving indentation or pockets are the same as those shown in Fig. 1. The only difference lies in the parallel integral projections 36, terminating as shown in Fig. 3 with elongate narrow apertures 37 therein short of their ends and the respective ends of the arm engaging element 38 secured thereto. The element 38 is of a suitable flexible (not stretchable) plastic or textile material with its ends formed in a desired number of turns about the outer portion of each projection 36 and through the apertures 37 where they are secured in place by any suitable means (not shown).

The species of the invention shown in Fig. 5 is similar in many details to the species shown in Figs. 1, 2, 3 and 4, particularly regarding the general structure, material and contours. The forward portion of the body 40 is rounded but in place of five finger receiving apertures there are only four and are identified by numbers 41, 42, 43 and 44. Where Figs. 1 and 3 illustrated a swimming paddle adapted for use with either hand, the species shown in Fig. 5 illustrates the right hand paddle of a given pair. In this figure there is but one thumb receiving indentation or pocket 45 positioned to receive the right thumb of the user. There is no arm engaging element in this species of the type shown in either Fig. 1 or Fig. 3 but the solid rearward portion 46 provides an arm engaging element or portion, engaging the lower rather than the upper part of the arm.

Reviewing now the three species of the invention, it will be observed that they contain all the features which may be desired by a swimmer. The first important feature is, they will float in water. If any one of the paddles should be dropped in water, it will not sink and become lost. The paddles provide sufficient increase in area to be consistent with feet equipped with flippers. The paddles are designed so that thrusts above and below the heel of the hand are substantially the same, to minimize torque which must be resisted at the wrist joint. The locations and contours of the finger receiving apertures and thumb receiving indentations or pockets provide a secure, comfortable and natural grip to minimize fatigue and discomfort, and with some variations possible to eliminate cramping of muscles over a long period of use. To illustrate, any one, two or three fingers may be removed from the apertures and laid flat against the back of the paddle to thereby permit a change in their positions while at the same time assist in manipulating the paddle. Other advantages are embodied in the facts that there is no need for variations in size, they are pleasing in appearance and "feel" and the cost of production is low. Furthermore, they have adequate physical strength and their hard, smooth solid surfaces resist sunlight, water and abrasion.

Where the species shown in Fig. 5 may be preferred by some in that a pair of this type may be gripped and released more readily, the species shown in Figs. 1 and 3 have the advantages of the arm engaging elements 27 and 38. These elements permit rapid freeing of the hands from the paddles without dropping the paddles, to grasp a dock or boat, or to use the hands for any other purpose. Also the elements strengthen and stabilize the grip and remove any possibility of strain on the wrist from heavy thrusts against the water. Another outstanding feature of the species shown in Figs. 1 and 3 is the interchangeability of the paddles. They may be used on either hand and a selection of any two paddles out of a group will give the swimmer a pair. The elements 27 and 38 serve as convenient handles for carrying the paddles in the hand when not in use or on the wrists during intervals when the paddles are not gripped by the fingers and thumbs.

The aforementioned method of forming the three species of swimming paddles by molding them of the suggested materials, so that they will float, permits the production of the paddles at prices pleasing to the public. It is recognized that even less expensive paddles may be made by injection molding with a conventional thermoplastic material, such as polystyrene. However, with the less expensive materials and methods of manufacture, certain advantages are lost including the "floating feature" which is considered very important.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A swimming paddle comprising a molded plastic body larger than a swimmer's hand and having a solid outer surface including thumb receiving indentations with smooth rounded edges in opposing side edges of the body and five finger receiving holes with smooth rounded edges arcuately disposed and conveniently spaced relative to each other and the indentations whereby the body may be gripped firmly in the areas of either indentation and any group of four holes by either hand of the swimmer, the plastic body having a cellular interior to cause it to float.

2. A swimming paddle comprising a molded plastic body larger than a swimmer's hand and having a solid outer surface including thumb receiving substantially V-shaped indentations with smooth rounded edges and curved vertex disposed in opposing side edges of the body and five finger receiving holes with smooth rounded edges arcuately disposed and conveniently spaced relative to each other and the indentations whereby the body may be gripped firmly in the areas of either indentation and any group of four finger receiving holes by either hand of the swimmer, the body having also rearwardly extending substantially parallel integral portions and an arm engaging strap connecting the ends of the portions to cooperate therewith and with the body to form an aperture through which either hand of the swimmer may be passed to grip the body, the plastic body having also a cellular interior to cause it to float.

References Cited in the file of this patent

UNITED STATES PATENTS

| Number | Name | Date |
|---|---|---|
| 675,695 | Whitcomb | June 4, 1901 |
| 1,455,826 | Yorgensen | May 22, 1923 |
| 1,708,331 | Ryan | Apr. 9, 1929 |
| 2,159,972 | Larson | May 30, 1939 |
| 2,655,485 | Hoffman | Oct. 13, 1953 |
| 2,660,194 | Hoffman | Nov. 24, 1953 |
| 2,684,341 | Anspon | July 20, 1954 |
| 2,692,995 | Le Bihan | Nov. 2, 1954 |

FOREIGN PATENTS

| Number | Country | Date |
|---|---|---|
| 274,669 | Great Britain | July 28, 1927 |
| 528,934 | France | Aug. 29, 1921 |